US012639604B2

(12) United States Patent
Liu et al.

(10) Patent No.: US 12,639,604 B2
(45) Date of Patent: May 26, 2026

(54) SOLVING OPTIMIZATION PROBLEMS ON SHALLOW CIRCUITS USING A QUANTUM COMPUTER

(71) Applicant: Fujitsu Limited, Kawasaki (JP)

(72) Inventors: Xiaoyuan Liu, Santa Clara, CA (US); Sarvagya Upadhyay, San Jose, CA (US); Indradeep Ghosh, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 780 days.

(21) Appl. No.: 18/046,186

(22) Filed: Oct. 13, 2022

(65) Prior Publication Data

US 2024/0135216 A1     Apr. 25, 2024

(51) Int. Cl.
*G06N 10/20* (2022.01)
*G06N 10/60* (2022.01)

(52) U.S. Cl.
CPC ............. *G06N 10/20* (2022.01); *G06N 10/60* (2022.01)

(58) Field of Classification Search
CPC .......... G06N 10/20; G06N 10/60; G06N 5/01; G06F 30/394
See application file for complete search history.

(56) References Cited

U.S. PATENT DOCUMENTS

| | | | | |
|---|---|---|---|---|
| 2019/0302107 A1* | 10/2019 | Kauffman | .............. | G06N 10/00 |
| 2020/0057817 A1* | 2/2020 | Weber | ...................... | G06N 5/01 |
| 2022/0366494 A1* | 11/2022 | Cella | ......................... | H04L 9/50 |
| 2023/0327969 A1* | 10/2023 | Saravanan | ............. | G06N 10/60 |
| | | | | 706/14 |

OTHER PUBLICATIONS

Herrman Rebekah, et al. "Multi-angle quantum approximate optimization algorithm." Scientific Reports 12.1 (2022): 1-10.
Liu Xiaoyuan, Shaydulin Ruslan, and Ilya Safro, "Quantum Approximate Optimization Algorithm with Sparsified Phase Operator." arXiv preprint arXiv:2205.00118 (2022).

(Continued)

*Primary Examiner* — Masud K Khan
(74) *Attorney, Agent, or Firm* — Fujitsu Intellectual Property Center

(57) ABSTRACT

According to an aspect of an embodiment, operations include receiving an input comprising a node-based graph associated with a real-world optimization problem and generating a sparse graph by removing a subset of edges from the node-based graph, The operations further include formulating operators of a quantum circuit on a quantum computer based on the sparse graph and formulating a cost function for the real-world optimization problem. The operations further include executing a set of operations which includes operating the quantum circuit on the quantum computer to generate a result, estimating a value of the cost function using the result, and updating parameters of the operators based on the value. The operations further include generating a final solution of the real-world optimization problem by repeating the execution of the set of operations using the updated parameters, until the estimated value of the cost function approaches a predefined threshold value.

19 Claims, 6 Drawing Sheets

(56)               References Cited

OTHER PUBLICATIONS

Farhi Edward, Goldstone Jeffrey, and Gutmann Sam, "A quantum approximate optimization algorithm." arXiv preprint arXiv:1411. 4028 (2014).

Extended European Search Report dated Mar. 6, 2024 for corresponding European Patent Application No. 23197378.5, 13 pages.

Ding, Chris H. Q. et al., "A Min-max Cut Algorithm for Graph Partitioning and Data Clustering," Data Mining, 2001, ICDM, Proceedings IEEE International Conference E. On San Jose, CA, USA, Nov. 29, 2001, Los Alamitos, CA, USA, IEEE Comput. Soc., pp. 107-114, XP010583266.

Liu, Xiaoyuan et al., "QuantumApproximate Optimization Algorithm with Sparsified Phase Operator," Cornell University Library, 201 Olin Library Cornell University, Ithaca, NY, 14853, Apr. 30, 2022, XP091211324, 9 pages.

Barahona, Francisco et al., "An Application of Combinatorial Optimization to Statistical Physics and Circuit Layout Design," Operations Research, vol. 36, No. 3, Jun. 1, 1988, pp. 493-513, XP093134472.

Wang, Zhen-Duo et al., "Quantum Dropout for Efficient Quantum Approximate Optimization Algorithm on Combinatorial Optimization Problems," Mar. 18, 2022, pp. 1-6, XP093134522, Retrieved from the Internet: URL: https://arxiv.org/pdf/2203.10101v1.pdf [retrieved on Feb. 23, 2024].

* cited by examiner

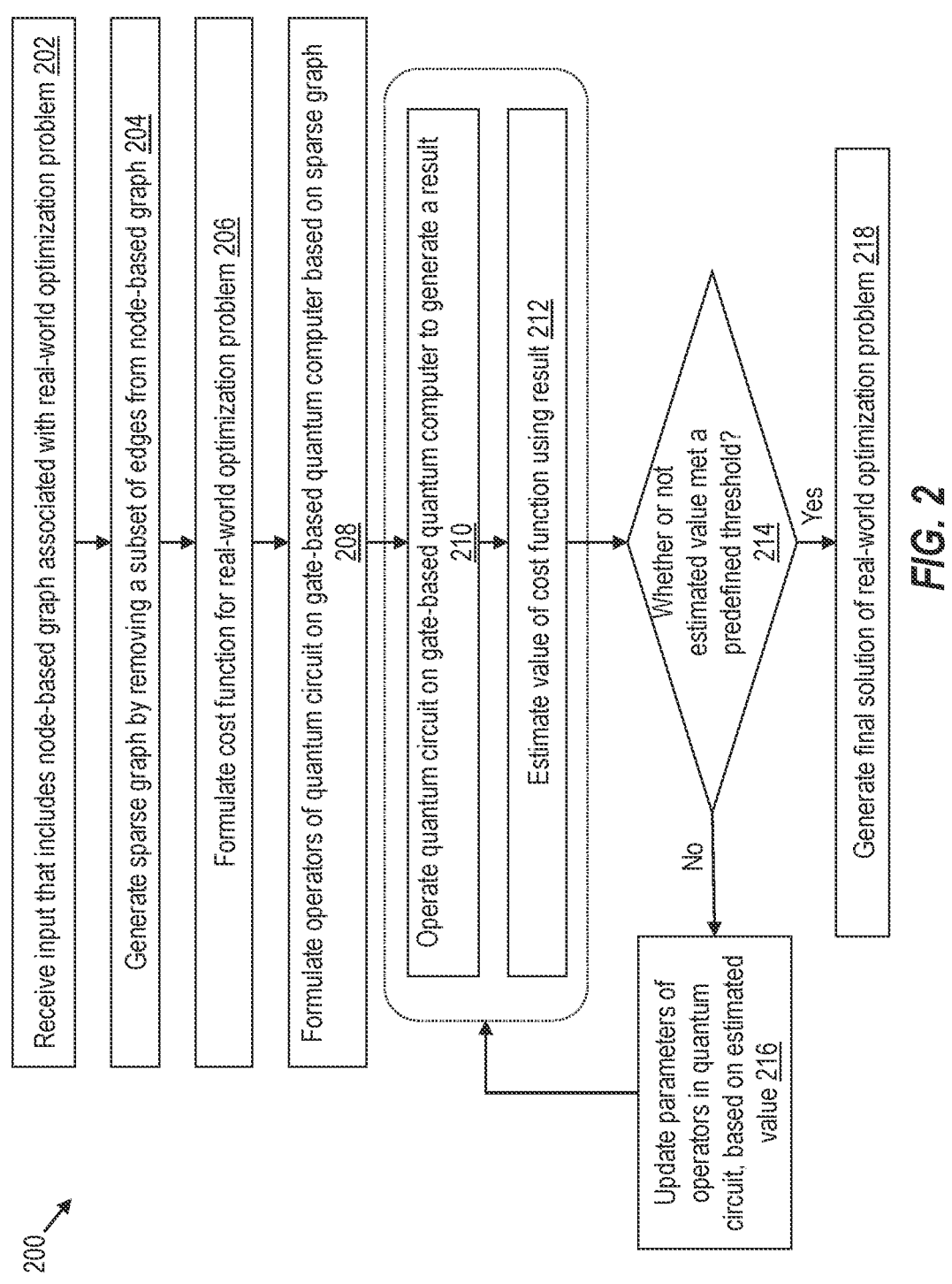

Receive input that includes node-based graph associated with real-world optimization problem 202

Generate sparse graph by removing a subset of edges from node-based graph 204

Formulate cost function for real-world optimization problem 206

Formulate operators of quantum circuit on gate-based quantum computer based on sparse graph 208

Operate quantum circuit on gate-based quantum computer to generate a result 210

Estimate value of cost function using result 212

Whether or not estimated value met a predefined threshold? 214

No

Yes

Update parameters of operators in quantum circuit, based on estimated value 216

Generate final solution of real-world optimization problem 218

SOLVING OPTIMIZATION PROBLEMS ON SHALLOW CIRCUITS USING A QUANTUM COMPUTER

FIELD

The embodiments discussed in the present disclosure are related to solving optimization problems on shallow circuits using a quantum computer.

BACKGROUND

Combinatorial optimization on near-term quantum devices may be a promising path to demonstrate quantum advantage. However, the capabilities of these devices may be constrained by high noise or error rates. Quantum Approximate Optimization Algorithm (QAOA) is a promising candidate algorithm for demonstrating quantum advantage in optimization using near-term quantum devices. However, due to the limitation of connectivity of the hardware, for graphs that may not be aligned with hardware connectivity, additional gates may be needed to implement the phase operator that encodes an objective function. For many graph-based optimization problems, conventional QAOA approach may utilize more quantum resources than desired for optimization.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of the disclosure, operations may include receiving an input comprising a node-based graph associated with a real-world optimization problem and generating a sparse graph by removing a subset of edges from the node-based graph, The operations may further include formulating operators of a quantum circuit on a gate-based quantum computer based on the sparse graph and formulating a cost function for the real-world optimization problem. The operations may further include executing a set of operations, which may include operating the quantum circuit on the gate-based quantum computer to generate a result, estimating a value of the cost function using the result, and updating parameters of the operators based on the value. The operations may further include generating a final solution of the real-world optimization problem by repeating the execution of the set of operations using the updated parameters, until the estimated value of the cost function approaches a predefined threshold value.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 2 is a flowchart of an example method for solving optimization problems on shallow circuits using a quantum computer.

DESCRIPTION OF EMBODIMENTS

Figure 1:
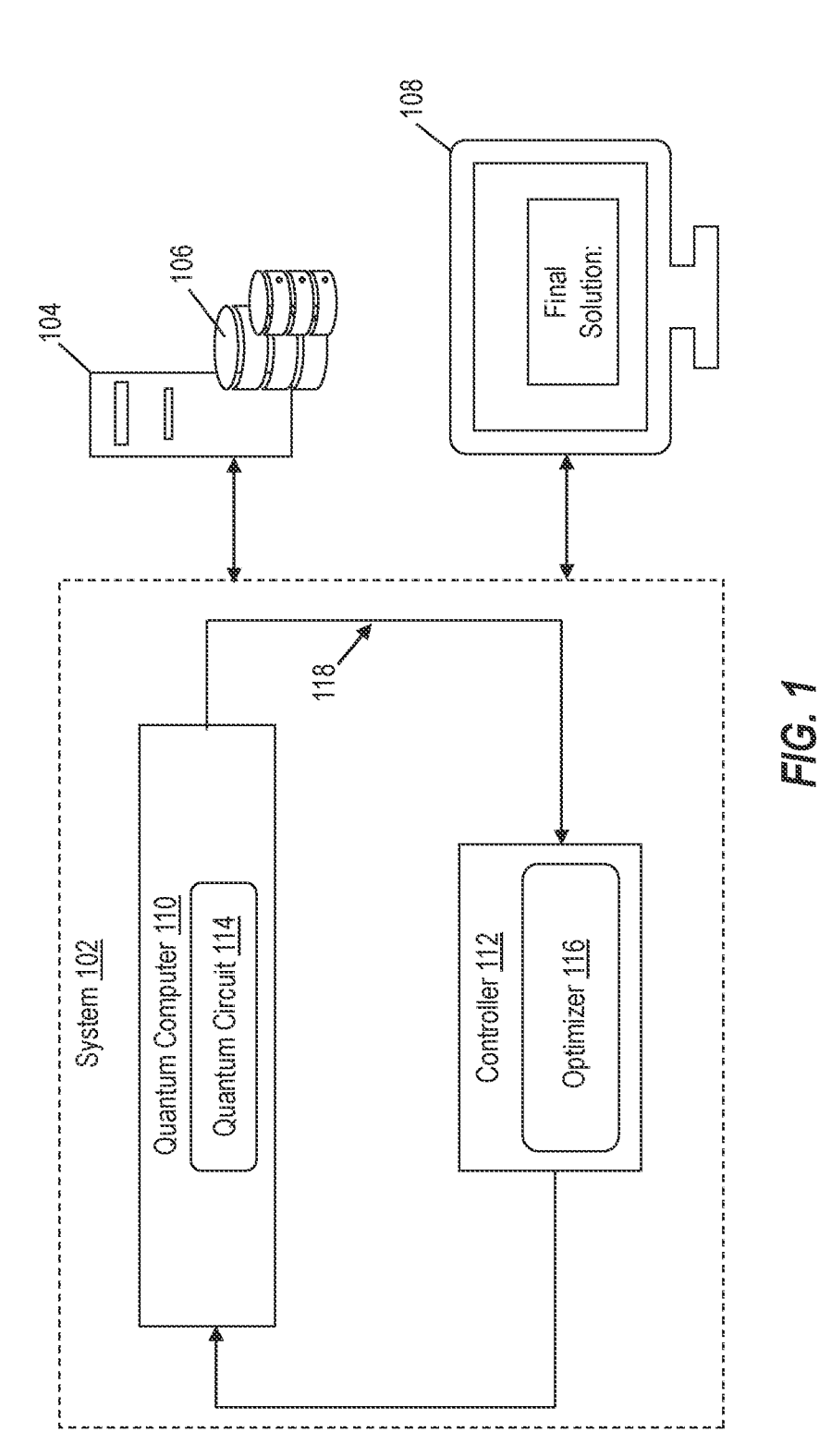
FIG. 1 is a diagram representing an exemplary computing environment for solving optimization problems on shallow circuits using a quantum computer.

Embodiments of the present disclosure are explained with reference to the accompanying drawings.

Some embodiments described in the present disclosure relate to methods and systems for solving optimization problems on shallow circuits using a quantum computer such as a gate-based quantum computer. Quantum computing holds a great promise for a variety of applications, which has fueled a quest to develop the necessary physical hardware. Quantum algorithms, for example, may factor numbers, simulate quantum systems, or solve linear systems of equations with an exponential speedup over classical methods. Due to the extremely high computational cost, applications such as simulating complex quantum systems or solving large-scale linear algebra problems may be extremely difficult for classical computers. Although fault-tolerant quantum computers may unlikely be available in the near future, quantum computers, especially gate-based quantum computers do promise a solution. Current quantum devices have significant limitations, such as a limited number of qubits and noise processes that limit circuit depth.

Hybrid quantum-classical algorithms, such as Quantum Approximate Optimization Algorithm (QAOA) may be seen as a promising candidate for demonstrating quantum advantage in optimization on near-term quantum computers. QAOA is typically used for obtaining approximate solutions of combinatorial optimization problems such as graph-based optimizations. At each call to the quantum computer, a trial state may be prepared by applying a sequence of pairs of alternating quantum operators. The two alternating operators may be referred to as a phase operator (which encodes the objective function of the combinatorial optimization problem), and the mixing operator.

Various approaches to improving QAOA have been investigated. Typically, these approaches include optimizing QAOA parameters, designing different mixing operators, employing various initialization strategies and cost functions, introducing error mitigation schemes, introducing additional parameters, constructing problem-specific instance-specific ansatzes, and so on. However, factors such as hardware connectivity, high error rates, and limited fidelity of the gates on near-term quantum devices may significantly restrict the performance of such hybrid algorithms, especially when the depth of the circuit is growing.

QAOA has high requirements on gate fidelity due to a need to encode the objective function in the phase separating operator, requiring a large number of gates that potentially do not match the hardware connectivity. Due to the limitation of the connectivity of the hardware, for graphs that are not aligned with hardware connectivity, additional gates may be needed to implement the phase operator that encodes the objective function.

The present disclosure may address all such problems by providing a solution which helps in efficient utilization of quantum resources available in a gate-based quantum computer while providing acceptable accuracy on solutions of optimization problems. The present disclosure discloses a hybrid computing system in which a quantum computer (e.g., a gate-based quantum computer) and a classical computer (i.e., a transistor-based computer) together perform operations to solve a real-world optimization problem by modelling the problem as a graph-based optimization problem such as max-cut problem and using QAOA on graph-based problem. The disclosure may be applied on any general optimization in quadratic form and may include many applications such as Ising model of spin glasses, Modularity maximization, VLSI circuit design, maximum balanced subgraph in a signed graph, data clustering, Maximum-2-Sat, and the like.

The disclosure may receive a dense graph (i.e., a node-based graph with nodes and edges) and may make use of classical approximation algorithms or heuristic algorithms to give an initial solution to sparsify the dense graph and generate a sparse graph. The sparse graph (without weights) may be used to formulate the phase operator of QAOA circuit (i.e., the quantum circuit). Additional classical parameters may be introduced into the phase operator and the mixing operator in QAOA circuit. By using unweighted graph (i.e., sparse graph without weights) in the phase operator, energy landscape for the phase operator may be smoother and the optimization may be easier to perform.

The method described in the disclosure may be applicable to NISQ devices as quantum resources for the method disclosed in the present disclosure are less as compared to conventional approaches. The present disclosure may provide ways to save quantum resources (e.g., by reducing gate count in the quantum circuit and using sparse graph instead of a dense graph) while achieving a comparable or even better approximation ratio in many cases. The quantum circuit of the present disclosure may be shallower and more suitable for NISQ devices.

FIG. 1 is a diagram representing an exemplary computing environment for solving optimization problems on shallow circuits using a quantum computer, according to at least one embodiment described in the present disclosure. With reference to FIG. 1, there is shown a computing environment 100. The computing environment 100 includes a system 102, a host terminal 104 storing a database 106, and a display device 108. The system 102 includes a quantum computer 110 and a controller 112. As further shown, a quantum circuit 114 may be implemented on the quantum computer 110 and an optimizer 116 may be implemented on the controller 112. In certain embodiments, the system 102 may be referred to as an optimization solver machine that implements a hybrid quantum-classical loop 118. The system 102, the host terminal 104, and the display device 108 may be communicatively coupled to each other, via a communication network (not shown).

The system 102 may be a part of an on-premise computing environment or a cloud computing environment. The system 102 may include suitable logic, circuitry, and interfaces that may be configured to execute operations associated with hybrid quantum-classical algorithms such as the Quantum Approximate Optimization Algorithm (QAOA) for solving combinatorial optimization problems. QAOA algorithm may be suitable for solving real-world optimization problems using resources of the quantum computer 110 and a classical computer (i.e., the controller 112). The real-world optimization problem may be any optimization problem that can be formulated as a graph-based problem such as weighted max-cut, unweighted max-cut, or min-max cut. For max-cut, goal is typically to split a set of vertices (V) of a graph (G) into two disjoint parts such that number of edges spanning two parts is maximized. Examples of the real-world optimization problem may include, but are not limited to, Ising model of spin glasses, problem of modularity maximization, VLSI circuit design (e.g., via minimization problem), data clustering problem, determination of maximum balanced subgraph in a signed graph, or maximum-2-Sat problem.

The host terminal 104 may include suitable logic, circuitry, and interfaces that may be configured to display a User Interface (UI) with option(s) to configure and submit a real-world optimization problem, The host terminal 104 may communicate with the system 102 via a network interface. Examples of the host terminal 104 may include, but are not limited to, a mobile device, a desktop computer, a laptop, a virtual machine, a computer workstation, or a server such as a cloud server. The host terminal 104 may maintain the database 106 for storing UI templates to configure optimization problems and information about the configured optimization problems.

The display device 108 may include suitable logic, circuitry, and interfaces that may be configured to display inputs provided by the host terminal 104 and outputs generated by the system 102. In certain embodiments, the display device 108 may enable a user to provide a user input via the display device 108. The display device 108 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 108 may refer to a display screen of a head mounted device (HMD), a smart-glass device, a see-through display, a projection-based display, an electro-chromic display, or a transparent display.

The quantum computer 110 may be a gate-based quantum computer that may be configured to receive an input and transform the input in accordance with a unitary operation (that may be defined as a sequence of quantum logic gate operations and measurements). The operation may be represented by the quantum circuit 114.

In one or more embodiments of the disclosure, the quantum computer 110 may be implemented as a generalized quantum computing device that may be hosted on a cloud optimization system. The cloud optimization system may be implemented as one of a private cloud, a public cloud, or a hybrid cloud. In such an implementation, the generalized quantum computing device may use specialized optimization solving software applications or simulation software at an application layer to implement hybrid quantum algorithms such as QAOA to search for a solution of an optimization problem from a discrete solution space.

The generalized quantum computing device may be different from a digital bit-based computing device, such as digital devices that are based on transistor-based digital circuits. The generalized quantum computing device may include one or more quantum logic gates that use quantum bits (hereinafter referred to as "qubits") to perform computations for different information processing applications, such as QAOA computations for vias minimization in VLSI design. In general, a qubit can represent "0", "1", or a superposition of both "0" and "1". In most cases, the generalized quantum computing device may need a carefully controlled cryogenic environment to function properly. The generalized quantum computing device may use certain properties found in quantum mechanical systems, such as quantum fluctuations, quantum superposition of its Eigenstates, quantum tunneling, and quantum entanglement. These properties may help the generalized quantum computing device to perform computations for solving certain mathematical problems (e.g., graph-based optimizations using QAOA circuits) to exhibit quantum advantage. Typically, these problems may be computationally intractable for conventional computing devices (e.g., classical computers that use transistor-based circuits). Examples of the generalized quantum computing device may include, but are not limited to, a silicon-based nuclear spin quantum computer, a trapped ion quantum computer, a cavity quantum-electro-dynamics (QED) computer, a quantum computer based on nuclear spins, a quantum computer based on electron spins in quantum dots, a superconducting quantum computer that uses superconducting loops and Josephson junctions, and a nuclear magnetic resonance quantum computer.

In some other embodiments, the quantum computer 110 may be a special-purpose quantum computer that may be designed, and hardware/software optimized to implement QAOA or meta-heuristic algorithms such as quantum annealing. Similar to a generalized quantum computing device, the special-purpose quantum computer may use qubits and may require a carefully controlled cryogenic environment to function properly.

In some other embodiments, the quantum computer 110 may be a digital quantum-computing processor for solving the optimization problems using QAOA. More specifically, the quantum computer 110 may be implemented as a quantum simulation software that may be executable on a digital computer with a semiconductor-based processor. The quantum simulation software may be designed to model the functionality of the quantum computer 110 on digital circuitry. The digital computer may operate at room temperature and may not require a cryogenic environment to function.

In some other embodiments, the quantum computer 110 may include a processor to execute software instructions such as subroutines for the quantum circuit 114. Example implementations of the processor may include, but are not limited to, a Reduced Instruction Set Computing (RISC) processor, an Application-Specific Integrated Circuit (ASIC) processor, a Complex Instruction Set Computing (CISC) processor, a Graphical Processing Unit (GPU), a Co-processor, and/or a combination thereof The controller 112 may include suitable logic, circuitry, and interfaces that may be configured to execute program instructions associated with the optimizer 116. The controller 112 may be a classical computer (i.e., a transistor-based computer with semiconductor-based digital circuitry) that operates in tandem or in conjunction with the quantum computer 110 to solve optimization problems.

The quantum circuit 114 may correspond to a computational routine (i.e., a set of instructions) that combines coherent quantum operations on quantum data, such as qubits with real-time classical computations. The quantum circuit 114 may include an ordered series of quantum logic gates, measurements, and resets that may be all be conditioned on real-time classical computation and may use data gathered from classical computation. In accordance with an embodiment, the quantum circuit 114 may be a QAOA circuit that includes a set of quantum logic gates for operators (e.g., phase and mixing operators) and a set of qubits (e.g., logical qubits that represent physical qubits) on which the operators and the quantum logic gates may be configured to operate. The set of qubits may correspond to at least one node pair of the sparse graph. For QAOA, the quantum logic gates may include, for example, one or more Hadamard gates, Rx and Rz gates (i.e., Rotation Operators), and a CNOT gate. The ansatz (and the quantum circuit 114) may vary depending on the node-based graph.

The optimizer 116 may be a software program or a routine/subroutine which, when executed by the controller 112, may compute values for parameters of the quantum circuit 114, based on a value of a cost function of the optimization problem. The optimizer 116 may be similar to an optimizer used in machine learning. The optimizer 116 may define a hyper-surface (i.e., a cost landscape), and the optimizer's task may be to navigate the landscape and find a global maxima (or minima) on the hyper-surface. Examples of the optimizer 116 may include, but are not limited to, gradient descent, stochastic gradient descent, adagrad, and ADAM.

During operation, the system 102 may receive an input that includes a node-based graph associated with the real-world optimization problem. For example, a User Interface (UI) on the host terminal 104 may display a user-editable template with options to submit information describing parameters, data, and/or constraints of the real-world optimization problem. The template may be used to receive an input from a user. Through the input, the user may be able to select and configure an optimization problem. For example, the options on the UI may include a button to upload the node-based graph or data that can be used to generate the node-based graph. The options may include another button to submit the node-based graph and/or the information to the system 102.

The node-based graph may describe a relationship between a plurality of nodes of the node-based graph through edges between node pairs of the plurality of nodes. For example, if the optimization problem is a data clustering problem, then nodes of the graph may represent individual datapoints of a dataset and weights for each edge between a node pair may represent a value of similarity metric between two datapoints.

After receiving the input, the system 102 may generate a sparse graph by removing a subset of edges from the node-based graph. Based on an input (e.g., a program input or a user input via the host terminal 104) and the sparse graph, a parameterized trial (ansatz) state of the form $|\Psi(\theta)\rangle = |\Psi(\beta, \gamma)\rangle$ may be formulated. Herein, an ansatz may be referred to as architecture of the quantum circuit 114 that includes a set of quantum logic gates which act on specific subsystems.

The system 102 may formulate operators of the quantum circuit 114 on the quantum computer 110 based on the sparse graph. For example, the operators may include a phase operator for which the sparse graph may be an unweighted graph, and the phase operator may be formulated to include a first parameter ($\gamma$) for each edge of the sparse graph. Similarly, the operators may include a mixing operator, which may be formulated to include a second parameter ($\beta$)

for the mixing operator. The first and second parameters $(\beta, \gamma)$ may be also referred to as parameters of the quantum circuit 114 (or the ansatz).

For the optimization problem, the system 102 may also formulate a cost function that encodes an objective function of the optimization problem. For example, the cost function may encode an objective function of the weighted max-cut problem in a quadratic form. The optimization problem may be solved on the quantum circuit 114 (i.e., a QAOA circuit) in the hybrid quantum-classical loop 118 using resources of both the quantum computer 110 and the optimizer 116 of the controller 112. Specifically, the ansatz may be trained in the hybrid quantum-classical loop 118 by varying the parameters $(\beta, \gamma)$ of the ansatz. In a set of iterations, the quantum computer 110 may be used to generate results (i.e., quantum evolution measurement outcomes) for estimation of the cost function and the optimizer 116 may be used to update the parameters so as to maximize an expected objective value of the quantum evolution measurement outcomes.

For the generated sparse graph, the system 102 may execute a set of operations that include operating the quantum circuit 114 on the quantum computer 110 to generate a result (e.g., a bit string) and estimating a value of the cost function using the result. For the generated result, the optimizer 116 may be used to update parameters $(\beta, \gamma)$ of the operators in the quantum circuit 114, based on the estimated value of the cost function. If difference in the value of the cost function and the predefined threshold value for the cost function is above a difference threshold (i.e., the value of the cost function is away from the predefined threshold value), then the set of operations may be repeated for the updated parameters. The system 102 may generate a final solution of the real-world optimization problem by repeating the execution of the set of operations using the updated parameters, until the estimated value of the cost function approaches the predefined threshold value. The value may be said to have approached the predefined threshold value if the difference in the value of the cost function and the predefined threshold value is below a difference threshold.

The final solution may be generated based on the result that may be generated by the quantum computer 110 and for which the estimated value of the cost function approaches the predefined threshold value. The system 102 may use a bit string (included in the result) to determine values of unknown variables (i.e., the final solution) of the real-world optimization problem. For example, if the optimization problem is about via minimization in VLSI design, then the final solution may include a layout assignment for a chip such that a total vias in chip design is a minimum.

In one or more embodiments, the system 102 may output the final solution of the real-world optimization problem to the display device 108. For example, the display device 108 may include a UI to render the final solution of the real-world optimization problem.

It should be noted that communication between the system 102, the host terminal 104, and the display device 108 may be performed via a communication network. The communication network may include a communication medium through which the system 102 may communicate with the host terminal 104 and servers (not shown). Examples of the communication network may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the computing environment 100 may be configured to connect to the communication network, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity(Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

FIG. 2 is a flowchart of an example method for solving optimization problems on shallow circuits using a quantum computer, arranged in accordance with at least one embodiment described in the present disclosure. FIG. 2 is explained in conjunction with elements from FIG. 1. With reference to FIG. 2, there is shown a flowchart 200. The example method illustrated in the flowchart 200 may start at 202 and may be performed by any suitable system, apparatus, or device, such as by the system 102 of FIG. 1.

At 202, an input that includes a node-based graph may be received. The system 102 may receive the input from the host terminal 104 via a UI (as described in FIG. 1). In accordance with an embodiment, the input may include an adjacency matrix to represent the node-based graph. The adjacency matrix typically represents a graph as a matrix of Boolean values. The value of the matrix may indicate whether a direct path exists between two vertices of the graph.

The node-based graph may be a dense graph that may be associated with a real-world optimization problem such as vias minimization in VLSI design, printed circuit layout design, or data clustering. The node-based graph may describe a relationship between a plurality of nodes of the node-based graph through the edges between node pairs of the plurality of nodes. By way of example, and not limitation, the node-based graph may be one of a weighted graph (undirected) or an unweighted graph (undirected). In order to solve the real-world optimization problem, the optimization problem may be modeled as a graph-based optimization problem such as max-cut or weighted max-cut problem.

In accordance with an embodiment, the input may include a target ratio for sparsification of the node-based graph. For example, a user may specify a target ratio of 0.3 (i.e., 30%) via the UI on the host terminal 104. Alternatively, the target ratio may be predefined for a size of the node-based graph or a type of optimization problem.

At 204, a sparse graph may be generated from the node-based graph. The system 102 may generate the sparse graph by removing a subset of edges from the node-based graph. The process of such removal may be referred to as a sparsification of the node-based graph. The subset of the edges may be removed such that a ratio of a number of edges in the subset and a number of the edges in the node-based graph is less than or equal to the target ratio (e.g., 0.3). The sparse graph may be generated by using a suitable approach, such as a graph approximation function, a heuristic, or a probabilistic graph sparsification function. The probabilistic graph sparsification function may include methods such as spectral graph sparsification that may preserve the cuts of the graph. Details of such approaches are known to one skilled in the art; therefore, the details are omitted from the disclosure for the sake of brevity.

The objective of sparsification is to select a representative graph $(G_1)$ from a given graph $(G_0)$ such that certain properties of the graph $(G_0)$ are preserved in graph $(G_1)$. Sparsifying the node-based graph (i.e., a problem graph)

may enable the system 102 to solve optimization problems involving the node-based graph with less quantum resources as compared to conventional approaches. In the context of QAOA (i.e., when a QAOA circuit is used) for solving max-cut problem, the count of quantum logic gates for operators such as the phase operator may be less for the sparse graph as compared to the node-based graph (i.e., a dense graph that includes more edges than the sparse graph). Based on experimental results, it is observed that the performance of QAOA may not deteriorate if the sparse graph leads to the same optimal solution. In some instances, the sparsification of the node-based graph may lead to a shallow quantum circuit and may help to achieve a comparable or better approximation ratio.

At 206, a cost function for the real-world optimization problem may be formulated. In accordance with an embodiment, the system 102 may formulate the cost function. For the cost function, original graph (i.e., the node-based graph) may be used instead of the sparse graph. In the context of QAOA on a graph-based problem such as the weighted max-cut problem, the cost function may be formulated to be a phase Hamiltonian (C) that may encode the objective function for the graph-based problem. An example of the phase Hamiltonian (C) for the weighted max-cut problem is provided using equations (1) and (2), as follows:

$$\langle C \rangle := \left\langle \vec{\beta\gamma} \middle| C \middle| \vec{\beta\gamma} \right\rangle \tag{1}$$

$$C = \frac{1}{2} \sum_{i,j \in E} w_{ij} (1 - Z_i Z_j) \tag{2}$$

where, i may be an Identity operator, $Z_i$ and $Z_j$ are Pauli-Z operators that may act on qubits (i and j), Qubits i and j may correspond to respective nodes of the node-based graph that are connected by edge $(i, j) \in E$ of the node-based graph, and $w_{ij}$ may represent weights for each edge $(i, j) \in E$ of the node-based graph.

At 208, operators of the quantum circuit 114 may be formulated. The system 102 may formulate the operators of the quantum circuit 114 on the quantum computer 110 based on the sparse graph. In accordance with an embodiment, the operators may include a phase operator for which the sparse graph may be an unweighted graph, and the phase operator may be formulated to include a first parameter (γ) for each edge of the sparse graph. Similarly, the operators may include a mixing operator which may be formulated to include a second parameter (β) for the mixing operator.

The formulation of the operators may be part of a parameterized state preparation process. As part of the process, the host terminal 104 or the controller 112 may send a call to the quantum computer 110. The call may be sent to the quantum computer 110 to configure the quantum circuit 114 (i.e., QAOA circuit) to prepare a trial state (ansatz) The trial state may be prepared by applying a sequence of alternating parameterized phase and mixing operator unitaries. The phase operator may be defined as U(H, γ) and the mixing operator may be defined as U(B, β). H may be referred to as the Hamiltonian operator that may encode the objective function of the optimization problem (e.g., weighted max-cut) in a computational basis state.

The quantum circuit 114 (i.e., QAOA circuit) for the weighted max-cut problem may include three components.

The first component may provide an initial state, that is, a uniform superposition over all possible states. This may be implemented by using Hadamard gates (H) on each qubit. The second component may be the phase operator U(H, γ) that corresponds to the phase Hamiltonian (equation (2)). The third component may be the mixing operator U(B, β) which may have $R_x(2\beta)$ gate for each qubit.

In comparison to conventional QAOA circuits which use original graph and edge weights in the circuit, the operators of the quantum circuit 114 may use the sparse graph with unweighted edges to formulate the phase operator. Instead of having only one parameter for the entire graph, a parameter may be assigned for each edge of the sparse graph. For the mixing operator, a single parameter may be assigned for entirety of the mixing operator and a single parameter for each qubit. Conventional approaches for applying QAOA on weighted max-cut or max-cut focused on design of the mixing operator or initialization of the QAOA. Conventional approaches also mainly focused on unweighted Max-Cut problem, i.e., the weight of each edge is 1. In contrast, the system 102 may focus on modifying the phase operator and using unweighted and sparse graph to formulate the phase operator, This may allow the system 102 to use a shallow quantum circuit while achieving a comparable or better approximation ratio.

After the parameterized state preparation, the trial state (prepared in 208) may be measured in the computational basis (as described at 212). The state preparation and measurement process may be iteratively repeated to determine parameters (β,γ) that maximize the value of the cost function (encodes the objective function).

At 210, the quantum circuit 114 on the quantum computer may be executed, In accordance with an embodiment, the quantum circuit 114 may be executed to generate a result. In the context of QAOA, the result may include a string of bits ($x \in \{0, 1\}^n$) that represent values for unknown variables (x) of the objective function of the graph-based problem. In order to determine whether the string in the result can be treated as the final solution of the optimization problem, the cost function must be evaluated, as described herein.

At 212. a value of the cost function may be estimated. In accordance with an embodiment, the controller 112 may estimate the value of the cost function (equations (1) and (2)) using the result (obtained at 210). Original graph (i.e., the node-based graph) in the input may be used for the estimation of the value.

At 214, it may be determined whether the estimated value of the cost function has met or approached a predefined threshold value. In accordance with an embodiment, the controller 112 may compare the estimated value of the cost function with the predefined threshold value to determine whether the estimated value of the cost function has met (or approached) the predefined threshold value. By way of example, and not limitation, the predefined threshold value may correspond to a maximum possible value ($C_{MAX}$) of the cost function, In accordance with an embodiment, the controller 112 may measure a quality of quantum state |γ,β⟩ by computing an approximation ratio (ρ) using equation (1) and the predefined threshold value ($C_{MAX}$). If value of the approximation ratio is close to 1, then the estimated value of the cost function may be said to have met or approached the predefined threshold value. In such a case, the result corresponding to quantum state |γ,β⟩ may be used to generate a final solution of the real-world optimization problem.

In case the estimated value of the cost function is determined to have approached the predefined threshold value, control may pass to 218. Otherwise, control may pass to 216.

At 216, parameters ($\beta,\gamma$) of the operators in the quantum circuit 114 may be updated. In accordance with an embodiment, the optimizer 116 of the controller 112 may update the parameters ($\beta,\gamma$) of the operators, based on the estimated value of the cost function. The update may be performed for a number of iterations so as to navigate the cost landscape (defined by the cost function) and to find a global maxima (or minima) on the cost landscape.

At 218, a final solution of the real-world optimization problem may be generated. The system 102 may generate the final solution by repeating the execution of a set of operations (210 to 214) using the updated parameters (obtained at 216), until the estimated value of the cost function approaches a predefined threshold value (e.g., the approximation ratio is more than 0.9 and is close to 1). The final solution may be generated based on the result (generated by the quantum computer 110), for which the estimated value of the cost function approaches the predefined threshold value.

The system 102 may use the bit string (included in the result) to determine values of unknown variables (i.e., the final solution) of the real-world optimization problem. For example, if the optimization problem is about via minimization in VLSI design, then the final solution may include a layout assignment for a chip such that a total vias in chip design is a minimum. As another example, if the optimization problem is about data clustering, then the final solution may include assignment of datapoints to a set of clusters.

Control may pass to end. Although the flowchart 200 is illustrated as discrete operations, such as 202, 204, 206, 208, 210, 212, 214, 216, and 218; however, in certain embodiments, such discrete operations may be further divided into additional operations, combined into fewer operations, or eliminated, depending on the particular implementation.

Figure 3:
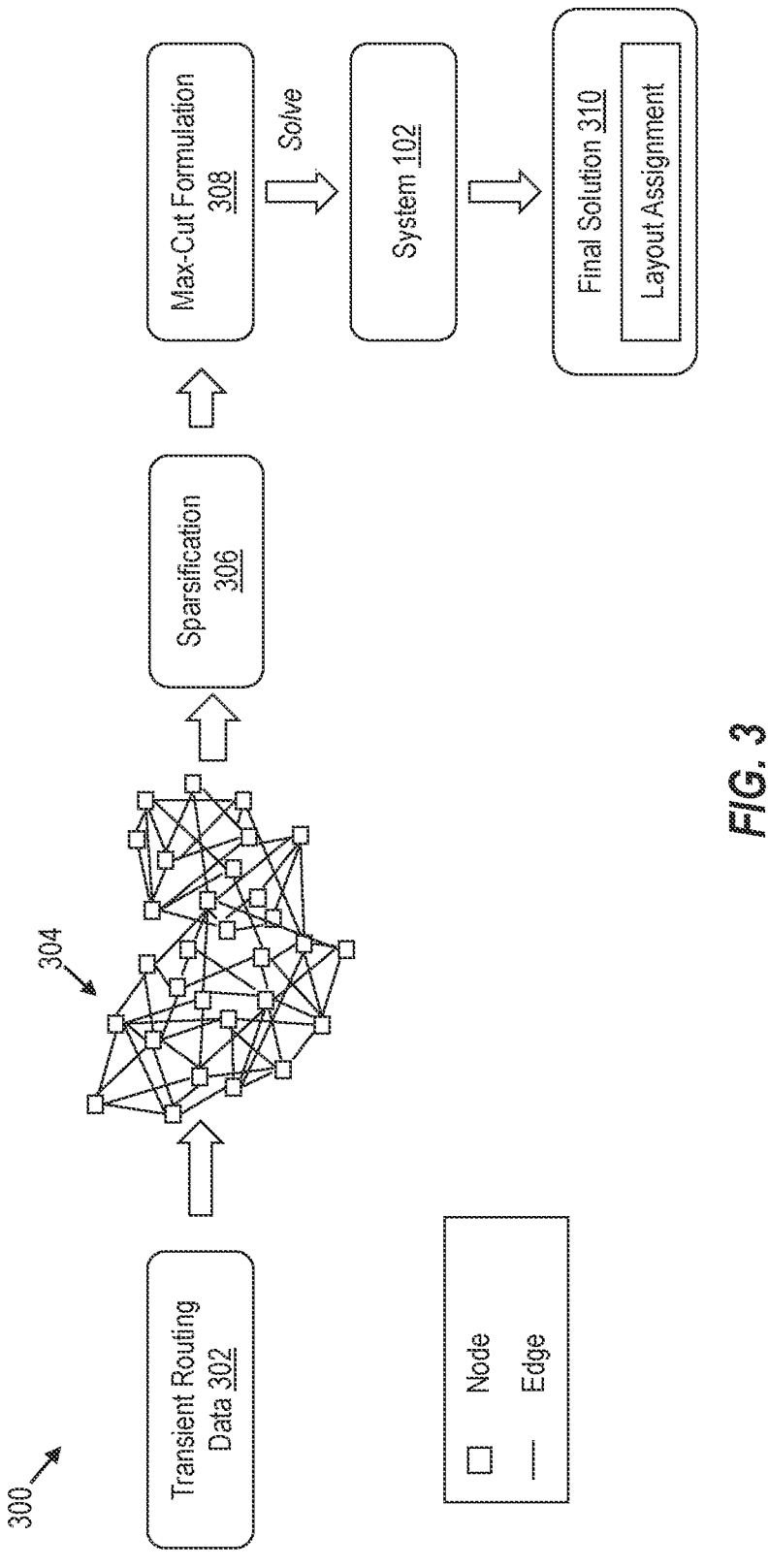
FIG. 3 is a diagram that illustrates exemplary operations for solving via minimization problems on shallow circuits using a quantum computer.

FIG. 3 is a diagram that illustrates exemplary operations for solving via minimization problems on shallow circuits using a quantum computer, in accordance with an embodiment of the disclosure. FIG. 3 is explained in conjunction with elements from FIG. 1 and FIG. 2. With reference to FIG. 3, there is shown a block diagram 300 that illustrates exemplary operations, as described herein. The exemplary operations illustrated in the block diagram 300 may be performed by any device, apparatus, or computing system, such as by the system 102 of FIG. 1. Although illustrated with discrete blocks, the exemplary operations associated with one or more blocks of the block diagram 300 may be divided into additional blocks, combined into fewer blocks, or eliminated, depending on the particular implementation.

Chip construction is usually divided into several phases in VLSI design and circuit board design, which may include placement, routing, and layer assignment. For the layer assignment problem, it may be assumed that all cells have been placed on a chip and all nets have been routed, but that wire segment assignment to layers has not been performed (i.e., transient routing). A net can link two or more pins. Wires from different nets may cross in transient routing. A feasible layer assignment must have the property of assigning such crossing wire segments to different layers. As a result, some wires may need to be routed on different layers. A via contact is typically used to physically change the layers. Vias may typically require additional space in VLSI design and are typically regarded as compaction obstacles that reduce fabrication yield. As a result, it may be preferable to find a layer assignment that minimizes the number of vias.

Certain design constraints (for example, two wires running parallel at the shortest possible distance within a given interval may not contain a via within that interval) may limit the placement of vias. Each wire can be divided into free and critical segments, with vias permitted on free segments but not on critical segments.

As input data for a VLSI design problem, the system 102 (e.g., the controller 112) may receive transient routing data 302 of a chip. The transient routing data 302 may be associated with a 2-layer vias minimization problem of a VLSI chip design task.

The system 102 (e.g., the controller 112) may construct a layout graph 304 for the chip based on the transient routing data 302. For two-layer assignment, it may be reasonable to assume that all nets connect exactly two pins, so each net has one wire. Every wire can be divided into free and critical segments. Critical segments may correspond to nodes of the layout graph 304. A conflict edge (when associated critical segments must be on different layers) and a continuation edge can be found in the layout graph 304 (when associated critical segments are connected by a free segment).

The system 102 (e.g., the controller 112) may formulate the 2-layer vias minimization problem as a max-cut problem 308, based on the layout graph 304. Specifically, the 2-layer via minimization problem may be formulated in terms of the layout graph 304. The objective of the minimization problem may require the system 102 to find a cut C of the layout graph 304 that includes all conflict edges A and includes as few continuation edges as possible.

The system 102 may solve the max-cut problem 308 by performing operations, described in the flowchart 200 of FIG. 2. For example, sparsification 306 may be applied on the layout graph 304 to obtain a reduced or sparse layout graph. In context of FIG. 1 and FIG. 2, the node-based graph may be considered as the layout graph 304. The cost function may encode an objective function for the max-cut problem and the final solution may be a solution of the max-cut problem and may include a layout assignment 310 for the chip such that the layout graph 304 is divided into two graphs with a minimum total vias.

Figure 4:
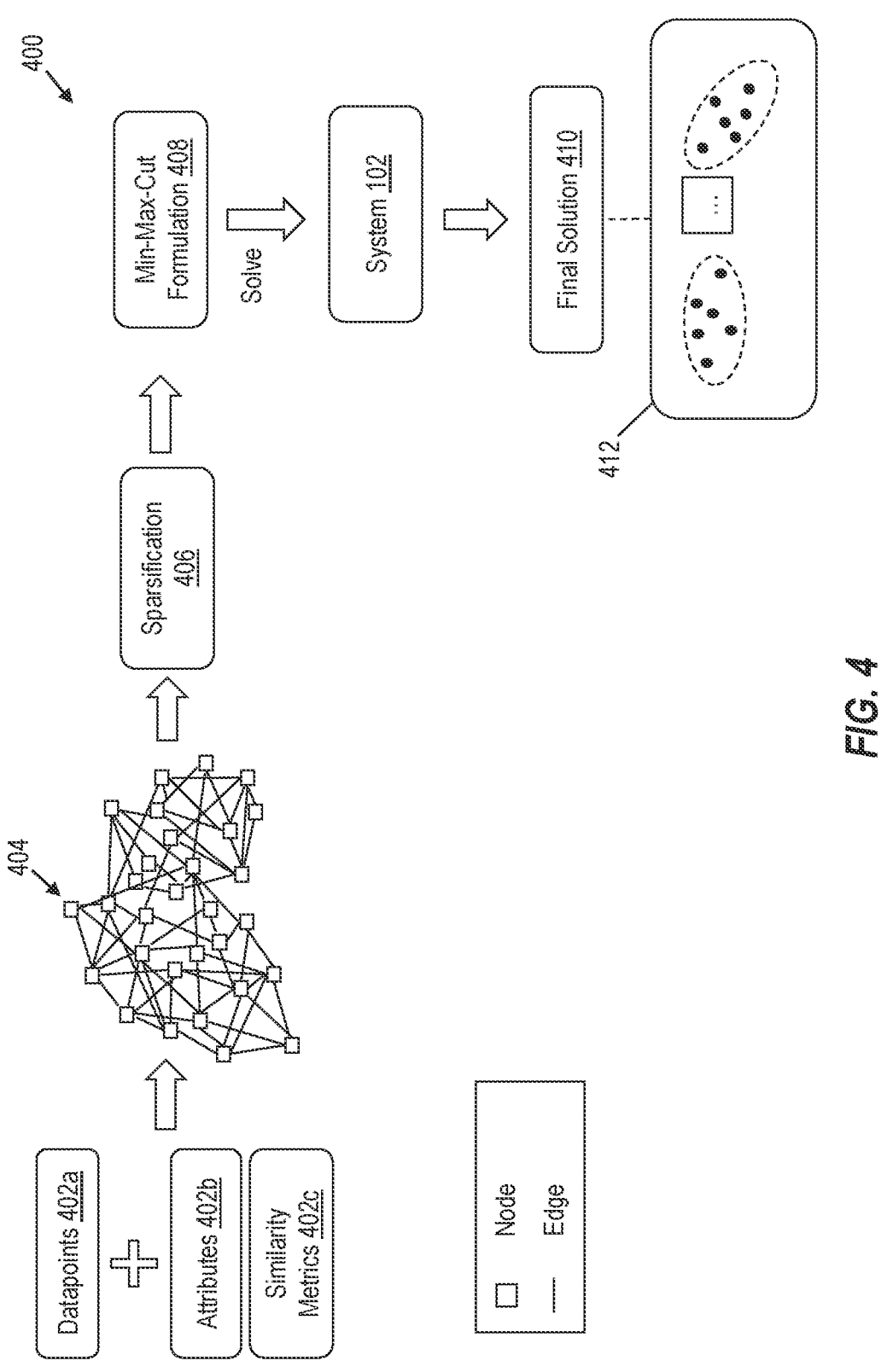
FIG. 4 is a diagram that illustrates exemplary operations for solving data clustering problems on shallow circuits using a quantum computer.

FIG. 4 is a diagram that illustrates exemplary operations for solving data clustering problems on shallow circuits using a quantum computer, in accordance with an embodiment of the disclosure. FIG. 4 is explained in conjunction with elements from FIG. 1 and FIG. 2. With reference to FIG. 4, there is shown a block diagram 400 that illustrates exemplary operations, as described herein. The exemplary operations illustrated in the block diagram 400 may be performed by any device, apparatus, or computing system, such as by the system 102 of FIG. 1. Although illustrated with discrete blocks, the exemplary operations associated with one or more blocks of the block diagram 400 may be divided into additional blocks, combined into fewer blocks, or eliminated, depending on the particular implementation.

In the context of unsupervised learning in data mining and machine learning, data clustering is an important problem that has use in many areas such as customer segmentation, medical imaging, search result clustering, recommendation engine, pattern recognition, social network analysis, and computer vision. Typically, a symmetric matrix containing similarities between all pairs of points may form a weighted adjacency matrix of an undirected graph, given attributes such as locations of data points in a dataset and similarity metric(s) between any pair of points. As a result, data clustering problem may be transformed into a graph partitioning problem.

During operation, the system 102 (e.g., the controller 112) may receive attributes 402b corresponding to datapoints 402a of a dataset and similarity metrics 402c between the datapoints 402a. The datapoints 402a, the attributes 402b, and the similarity metrics 402c may be received as input data associated with a data clustering problem. Example of the similarity metrics 402c may include, but is not limited to, Euclidean distance, Manhattan distance, Minkowski distance, and Cosine similarity.

After receiving, the system 102 (e.g., the controller 112) may generate an adjacency matrix for all pairs of the datapoints 402a, based on the similarity metrics 402c and the attributes 402b. The adjacency matrix may define a weighted and undirected graph representation 404 of the datapoints 402a of the dataset.

The system 102 (e.g., the controller 112) may formulate the data clustering problem as a min-max cut problem 408 based on the adjacency matrix. For the weighted and undirected graph representation 404 (G=G(E,V) with node set V, edge set E and weight matrix W), the objective may require the system 102 to partition the weighted and undirected graph representation 404 into two subgraphs X and Y based on min-max clustering approach. The partitioning may be performed such that similarity between the two subgraphs (X and Y) is a minimum and similarity within each subgraph (i.e., a sum of similarity between all pairs of nodes within the subgraph X and the subgraph Y) is a maximum.

The system 102 may solve the min-max cut problem 408 by performing operations, described in the flowchart 200 of FIG. 2. For example, a sparsification 406 may be performed on the weighted and undirected graph representation 404 to form a reduced or sparse graph. In context of FIG. 1 and FIG. 2, the node-based graph may be considered as the weighted and undirected graph representation 404 of the datapoints. The cost function may encode an objective function for the min-max cut problem 408. The final solution (i.e., solution 410) may be a solution of the min-max cut problem and may include a partition of the datapoints into a set of clusters 412 (e.g., two clusters). In the solution 410, the datapoints 402a may be partitioned into two clusters such that the similarity between the two clusters is a minimum and similarity within a cluster is a maximum.

Figure 5:
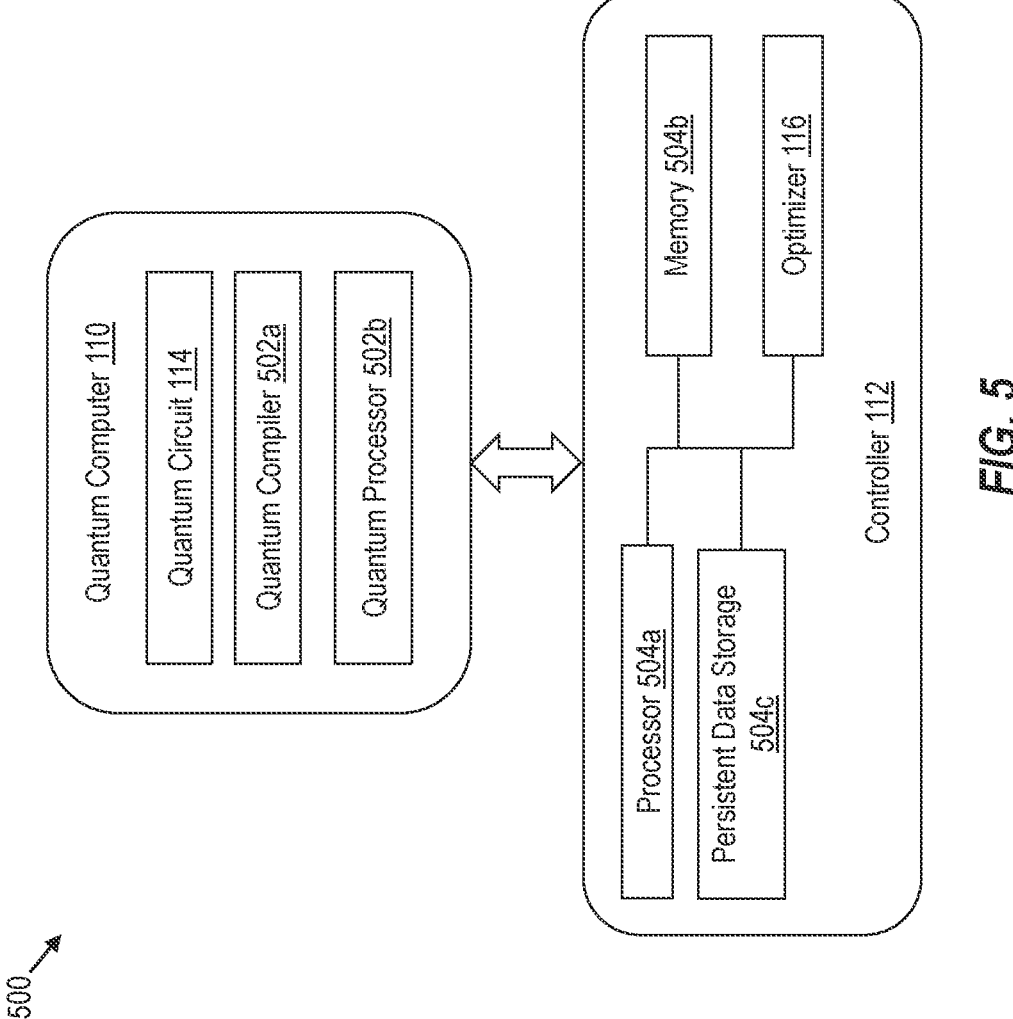
FIG. 5 is a block diagram of a system for solving optimization problems on shallow circuits using a quantum computer.

FIG. 5 is a block diagram of a system for solving optimization problems on shallow circuits using a quantum computer, according to at least one embodiment of the disclosure. FIG. 5 is explained in conjunction with elements from FIG. 1, FIG. 2, FIG. 3, and FIG. 4. With reference to FIG. 5, there is shown a block diagram 500 of the system 102. The system 102 includes the quantum computer 110 and the controller 112. As shown, for example, the quantum computer 110 is a gate-based quantum computer that includes the quantum circuit 114, a quantum compiler 502a, and a quantum processor 502b. Similarly, the controller 112 may be a transistor-based computer (i.e., a classical computer) that includes a processor 504a, a memory 504b, a persistent data storage 504c, and the optimizer 116. In certain embodiments, the optimizer 116 may be stored in the memory 504b. The processor 504a and the quantum processor 502b may be referred to as one or more processors of the system 102.

Typically, a compiler is a computer program that is configured to translate computer code between two languages, i.e., source and target languages, Since quantum algorithms require error-free qubits and logic gates, the quantum compiler 502a may be configured to translate quantum gate operations used in quantum algorithms such as QAOA into machine level operations and reduce loss of quantum information because of decoherence. A compiler for a gate-based quantum computer may perform synthesis of quantum gates at both physical and logical layers. The quantum compiler 502a may operate on sequence of instructions (e.g., the quantum circuit 114) to ensure that such instructions are executable on the quantum computer 110. Such instructions may utilize quantum instruction sets to turn high-level algorithms into physical instructions that may be executable on the quantum processor 502b.

The quantum processor 502b (also referred to as a quantum processing unit (QPU) may refer to a physical device (e.g., a chip) that may include a set of interconnected qubits. The quantum processor 502b may typically include a housing environment (e.g., a cooling mechanism to achieve cryogenic temperature), a control system for the quantum processor 502b, and the like.

Although not illustrated, the quantum computer 110 may have a hierarchical architecture with layers such as a physical layer, a virtual layer, an error correction layer, a logical layer, and an application layer. The physical layer may include hardware including, but not limited to, physical qubits and control operations. The virtual layer may incorporate error cancellation and may be responsible for collecting quantum dynamics of qubits and shaping them into virtual qubits and quantum gates. The error correction layer may incorporate quantum error correction logic for fault-tolerant quantum computing. The logical layer may support universal quantum computing by acting as a hardware-independent layer. The application layer may be a hardware independent layer that relies on logical qubits. The application layer may receive quantum algorithm as a sequence of high-level operations, including the quantum circuit 114.

The processor 504a may include suitable logic, circuitry, and/or interfaces that may be configured to execute program instructions associated with different operations to be executed by the system 102. The processor 504a may include any suitable special-purpose or general-purpose computer, computing entity, or processing device including various computer hardware or software modules and may be configured to execute instructions stored on any applicable computer-readable storage media. For example, the processor 504a may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 504a may include any number of processors configured to, individually or collectively, perform or direct performance of any number of operations of the system 102, as described in the present disclosure.

In some embodiments, the processor 504a may be configured to interpret and/or execute program instructions and/or process data stored in the memory 504b and/or the persistent data storage 504c. In some embodiments, the processor 504a may fetch program instructions from the persistent data storage 504c and load the program instructions in the memory 504b. After the program instructions are loaded into memory 504b, the processor 504a may execute the program instructions. Some of the examples of the processor 504a may be a GPU, a CPU, a RISC processor, an ASIC processor, a CISC processor, a co-processor, and/or a combination thereof.

The memory 504b may include suitable logic, circuitry, and/or interfaces that may be configured to store program instructions executable by the processor 504a. In certain embodiments, the memory 504b may be configured to store the node-based graph, the sparse graph that may be obtained from the node-based graph, and intermediate and final values of cost function and final solution. The memory 504*b* may include computer-readable storage media for carrying or having computer-executable instructions or data struc- tures stored thereon. Such computer-readable storage media may include any available media that may be accessed by a general-purpose or special-purpose computer, such as the processor 504*a*.

By way of example, and not limitation, such computer- readable storage media may include tangible or non-transi- tory computer-readable storage media including Random Access Memory (RAM), Read-Only Memory (ROM), Elec- trically Erasable Programmable Read-Only Memory (EE- PROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special- purpose computer. Combinations of the above may also be included within the scope of computer-readable storage media. Computer-executable instructions may include, for example, instructions and data configured to cause the processor 504*a* to perform a certain operation or group of operations associated with the system 102.

The persistent data storage 504*c* may include suitable logic, circuitry, and/or interfaces that may be configured to store program instructions executable by the processor 504*a*, operating systems, and/or application-specific information, such as logs and application-specific databases. The persis- tent data storage 504*c* may be configured to store informa- tion, such as the set of mathematical formulations associated with the real-world optimization problem. The persistent data storage 504*c* may include computer-readable storage media for carrying or having computer-executable instruc- tions or data structures stored thereon. Such computer- readable storage media may include any available media that may be accessed by a general-purpose or special-purpose computer, such as the processor 504*a*.

By way of example, and not limitation, such computer- readable storage media may include tangible or non-transi- tory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instruc- tions or data structures and which may be accessed by a general-purpose or special-purpose computer. Combinations of the above may also be included within the scope of computer-readable storage media. Computer-executable instructions may include, for example, instructions and data configured to cause the processor 504*a* to perform a certain operation or group of operations associated with the system 102.

Modifications, additions, or omissions may be made to the system 102 without departing from the scope of the present disclosure. For example, in some embodiments, the system 102 may include any number of other components that may not be explicitly illustrated or described.

Figure 6:
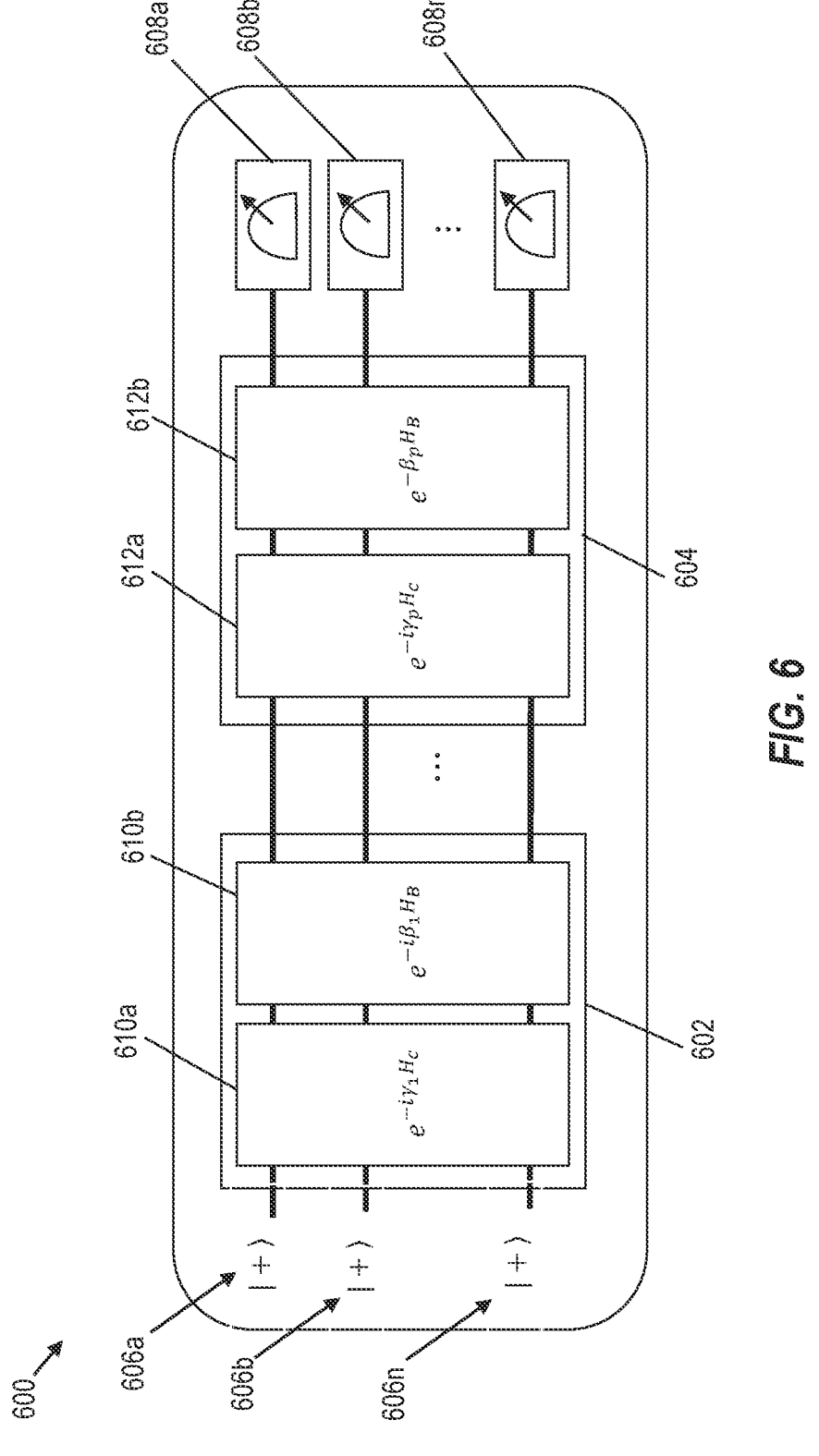
FIG. 6 is a schematic diagram of a p-level Quantum Approximation Optimization Algorithm (QAOA) for solving optimization problems on shallow circuits using a quantum computer, all according to at least one embodiment described in the present disclosure.

FIG. 6 is a schematic diagram of a p-level Quantum Approximation Optimization Algorithm (QAOA) for solv- ing optimization problems on shallow circuits using a quantum computer, according to at least one embodiment of the disclosure. FIG. 6 is explained in conjunction with elements from FIG. 1, FIG. 2, FIG. 3, FIG. 4, and FIG. S. With reference to FIG. 6, there is shown a schematic diagram of a p-level QAOA circuit 600. The p-level QAOA circuit 600 may be an exemplary implementation of the quantum circuit 114 of FIG. 1.

The p-level QAOA circuit 600 includes and initial equal superposition state (using Hadamard gates), followed by an alternate sequence 602 . . . 604 of cost unitary operators 610*a* . . . 612*a* and mixer unitary operators 610*b* . . . 612*b* that applied on qubits 606*a* . . . 606*n* to prepare a param- etrized state. Corresponding to the qubits 606*a* . . . 606*n*, measurements 608*a* . . . 608*n* may be performed in compu- tational basis state when the p-level QAOA circuit 600 is executed for a number of iterations. Such iterations may typically be performed to determine a bit string, $x \in \{0,1\}^n$ of size n that maximizes or minimizes a cost function of an optimization problem such as weighted max-cut. The cost unitary operators 610*a* . . . 612*a* and mixer unitary operators 610*b* . . . 612*b* may be applied p times using different parameters $\gamma_1 \ldots \gamma_p$ and $\beta_1 \ldots \beta_p$.

Various embodiments of the disclosure may provide a non-transitory computer-readable storage medium config- ured to store instructions that, in response to being executed, causes a system (such as the system 102) to perform operations that include receiving an input comprising a node-based graph associated with a real-world optimization problem and generating a sparse graph by removing a subset of edges from the node-based graph, The operations further include formulating operators of a quantum circuit on a quantum computer based on the sparse graph and formulat- ing a cost function for the real-world optimization problem. The operations further include executing a set of operations which includes operating the quantum circuit on the quan- tum computer to generate a result, estimating a value of the cost function using the result, and updating parameters of the operators based on the value. The operations further include generating a final solution of the real-world optimization problem by repeating the execution of the set of operations using the updated parameters, until the estimated value of the cost function approaches a predefined threshold value.

As used in the present disclosure, the terms "module" or "component" may refer to specific hardware implementa- tions configured to perform the actions of the module or component and/or software objects or software routines that may be stored on and/or executed by general purpose hardware (e.g., computer-readable media, processing devices, etc.) of the computing system. In some embodi- ments, the different components, modules, engines, and services described in the present disclosure may be imple- mented as objects or processes that execute on the comput- ing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "includ- ing" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
  receiving an input that includes a node-based graph associated with a real-world optimization problem;
  generating a sparse graph by removing a subset of edges from the node-based graph;
  formulating operators of a quantum circuit on a quantum computer based on the sparse graph;
  formulating a cost function for the real-world optimization problem;
  executing a set of operations comprising:
  operating the quantum circuit on the quantum computer to generate a result;
  estimating a value of the cost function using the result; and
  updating parameters of the operators in the quantum circuit, based on the value;
  generating a final solution of the real-world optimization problem by repeating the execution of the set of operations using the updated parameters, until the estimated value of the cost function approaches a predefined threshold value;
  receiving transient routing data of a chip as input data associated with a 2-layer vias minimization problem of a Very Large Scale Integrated (VLSI) chip design task;
  constructing a layout graph for the chip based on the transient routing data; and
  formulating the 2-layer vias minimization problem as a max-cut problem, based on the layout graph;
  the node-based graph is the layout graph, the cost function encodes an objective function for the max-cut problem, and the final solution is a solution of the max-cut problem and includes a layout assignment for the chip such that the layout graph is divided into two graphs with a minimum total vias.

2. The method according to claim 1, wherein the real-world optimization problem is a graph-based optimization problem, and the node-based graph describes a relationship between a plurality of nodes of the node-based graph through the edges between node pairs of the plurality of nodes.

3. The method according to claim 2, wherein the graph-based optimization problem is a max-cut problem.

4. The method according to claim 1, further comprising:
  receiving, as input data associated with a data clustering problem, attributes corresponding to datapoints of a dataset and similarity metrics between the datapoints;
  generating an adjacency matrix for all pairs of the data-points, based on the similarity metrics and the attri-butes,
  wherein the adjacency matrix defines a weighted and undirected graph representation of the datapoints of the dataset;
  formulate the data clustering problem as a min-max cut problem based on the adjacency matrix,
  wherein the node-based graph is the weighted and undi-rected graph representation of the datapoints,
  the cost function encodes an objective function for the min-max cut problem, and
  the final solution is a solution of the min-max cut problem and includes a partition of the datapoints into a set of clusters.

5. The method according to claim 1, wherein the node-based graph is a weighted graph or an unweighted graph.

6. The method according to claim 1, wherein the sparse graph is generated by using a graph approximation function, a heuristic, or a probabilistic graph sparsification function.

7. The method according to claim 1, wherein the input further includes a target ratio for a sparsification of the node-based graph, and the subset of the edges is removed such that a ratio of a number of edges in the subset and a number of the edges in the node-based graph is less than or equal to the target ratio.

8. The method according to claim 1, wherein the quantum circuit is a Quantum Approximation Optimization Algo-rithm (QAOA) circuit that includes a set of quantum logic gates for the operators and a set of qubits on which the operators and the quantum logic gates are configured to operate.

9. The method according to claim 1, wherein the set of qubits corresponds to at least one node pair of the sparse graph.

10. The method according to claim 1, wherein the opera-tors comprise a phase operator for which the sparse graph is an unweighted graph, and the phase operator is formulated to include a first parameter (γ) for each edge of the sparse graph.

11. The method according to claim 1, wherein the operators comprise a mixing operator which is formulated to include a second parameter (β) for the mixing operator.

12. The method according to claim 1, wherein the estimation of the value of the cost function and the update of the parameters of the operators is performed by executing an optimizer function on a transistor-based computer for a set of iterations.

13. The method according to claim 1, wherein the final solution is generated based on the result that is generated by the quantum computer and for which the estimated value of the cost function approaches the predefined threshold value.

14. The method according to claim 1, wherein the result is a bit string and the final solution includes values for unknown variables of the real-world optimization problem.

15. A non-transitory computer-readable storage medium configured to store instructions that, in response to being executed, causes a system to perform operations, the operations comprising:

receiving an input that includes a node-based graph associated with a real-world optimization problem;

generating a sparse graph by removing a subset of edges from the node-based graph;

formulating, based on the sparse graph, operators of a quantum circuit on a quantum computer of the system;

formulating a cost function for the real-world optimization problem;

executing a set of operations comprising:

operating the quantum circuit on the quantum computer to generate a result;

estimating a value of the cost function using the result; and updating parameters of the operators in the quantum circuit, based on the value;

generating a final solution of the real-world optimization problem by repeating the execution of the set of operations using the updated parameters, until the estimated value of the cost function approaches a predefined threshold value;

receiving transient routing data of a chip as input data associated with a 2-layer vias minimization problem of a Very Large Scale Integrated (VLSI) chip design task;

construct a layout graph for the chip based on the transient routing data; and formulate the 2-layer vias minimization problem as a max-cut problem, based on the layout graph;

the node-based graph is the layout graph, the cost function encodes an objective function for the max-cut problem, and the final solution is a solution of the max-cut problem and includes a layout assignment for the chip such that the layout graph is divided into two graphs with a minimum total vias.

16. The non-transitory computer-readable storage medium according to claim 15, wherein the quantum circuit is a Quantum Approximation Optimization Algorithm (QAOA) circuit that includes a set of quantum logic gates for the operators and a set of qubits on which the operators and the quantum logic gates are configured to operate.

17. The non-transitory computer-readable storage medium according to claim 15, wherein the operators comprise:

a phase operator for which the sparse graph is an unweighted graph, and the phase operator is formulated to include a first parameter (γ) for each edge of the sparse graph, and a mixing operator which is formulated to include a second parameter (β) for the mixing operator.

18. The non-transitory computer-readable storage medium according to claim 15, wherein the final solution is generated based on the result that is generated by the quantum computer and for which the estimated value of the cost function approaches the predefined threshold value, and the result is a bit string and the final solution includes values for unknown variables of the real-world optimization problem.

19. A system, comprising:

one or more processors that are configured to:

receive an input that includes a node-based graph associated with a real-world optimization problem;

generate a sparse graph by removing a subset of edges from the node-based graph;

formulate, based on the sparse graph, operators of a quantum circuit on a quantum computer of the system;

formulate a cost function for the real-world optimization problem;

execute a set of operations that include:

an operation of the quantum circuit on the quantum computer to generate a result, an estimation of a value of the cost function using the result, and an update of parameters of the operators in the quantum circuit, based on the value;

generate a final solution of the real-world optimization problem by repeating the execution of the set of operations using the updated parameters, until the estimated value of the cost function approaches a predefined threshold value;

receive transient routing data of a chip as input data associated with a 2-layer vias minimization problem of a Very Large Scale Integrated (VLSI) chip design task;

construct a layout graph for the chip based on the transient routing data; and formulate the 2-layer vias minimization problem as a max-cut problem, based on the layout graph;

the node-based graph is the layout graph, the cost function encodes an objective function for the max-cut problem, and the final solution is a solution of the max-cut problem and includes a layout assignment for the chip such that the layout graph is divided into two graphs with a minimum total vias.

* * * * *